United States Patent [19]

Severinsson

[11] Patent Number: 4,615,228
[45] Date of Patent: Oct. 7, 1986

[54] DEVICE FOR MECHANICALLY TRANSFORMING A TORQUE INTO AN AXIAL FORCE

[76] Inventor: Lars M. Severinsson, S-310 21 Hishult, Sweden

[21] Appl. No.: 733,929

[22] Filed: May 14, 1985

[30] Foreign Application Priority Data

May 22, 1984 [SE] Sweden .................... 8402746

[51] Int. Cl.⁴ .................... F16H 21/44; F16H 21/54
[52] U.S. Cl. .................... 74/89; 74/99 R; 74/110
[58] Field of Search .................... 74/89, 99 R, 110

[56] References Cited

U.S. PATENT DOCUMENTS 1,346,625  7/1920  Woodward .................... 74/99
3,706,465  12/1972  Olowinski .................... 74/99
4,196,636  4/1980  Beazley .................... 74/110

FOREIGN PATENT DOCUMENTS 18258  10/1980  European Pat. Off. .................... 74/110
1538482  9/1968  France .................... 74/110
750191  7/1980  U.S.S.R. .................... 74/110

Primary Examiner—Lawrence Staab
Attorney, Agent, or Firm—Laurence R. Brown

[57] ABSTRACT

A device for mechanically transforming a torque into an axial force.

A long, cylindrical rubber body (16) is enclosed within a tightly wound coil spring (15) and on its short sides by an axially fixed, torque-receiving end wall (12) and an axially movable, force-transmitting cover (17) respectively. One of the ends of the spring accompanies the end wall as it rotates, in so doing causing the diameters of the spring and the rubber body to reduce and the length of the body to increase.

4 Claims, 1 Drawing Figure

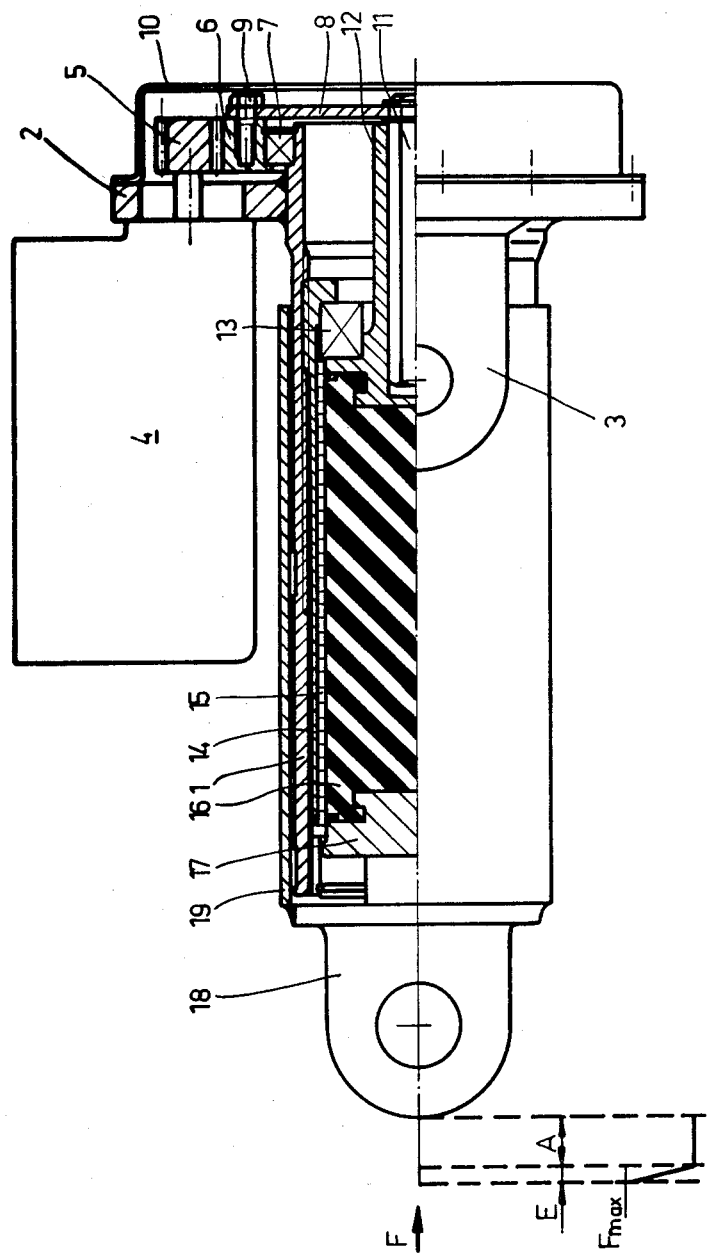

DEVICE FOR MECHANICALLY TRANSFORMING A TORQUE INTO AN AXIAL FORCE

TECHNICAL FIELD

The present invention relates to a device for mechanically transforming a torque into an axial force.

DESCRIPTION OF THE PRIOR ART

There is often a need during force-transmission to transform a rotating motion into a certain axial motion. A typical example is provided by the various arrangements in which an ordinary electric motor is utilized as a power source to provide a short, axial working stroke, for example in a brake, a clamping means or a gripping device, etc.

Various previously disclosed means of meeting this requirement do not satisfy all the demands with regard to operating reliability, simplicity, low cost and high efficiency.

THE INVENTION

These and other demands are met by a device of the kind referred to above, which in accordance with the invention is characterized by a long rubber body enclosed within a tightly wound coil spring, one end of which is attached to an axially fixed, torque-receiving end wall in contact with one of the short sides of the rubber body and the other end of which is attached to an axially movable, force-transmitting cover in contact with the other short side of the rubber body, the device being so constructed that the diameter of the coil spring and thus of the rubber body is reduced as the end wall rotates under the effect of the torque and the length of the rubber body is correspondingly increased.

A device of this kind must, before the actual working stroke occurs, execute an application stroke, that is to say the force-transmitting part of the device must move from a rest position or neutral position to a position in which the actual transmission of force is to commence, usually when the force-transmitting part comes into contact with a force-receiving part and thus when a counter-force begins to develop.

The application stroke can be long and may vary for different operating cycles, whereas the actual working stroke is often short and must exert a high terminal force.

In order in the case of a device as indicated above, enclosed within a fixed, cylindrical housing, to achieve a rapid application stroke of variable length for a rotating input motion, the coil spring is arranged inside a cylindrical sleeve, to which the end of the coil spring at the cover is fixed, and which is provided with external threads in engagement with internal threads inside the housing.

When the force-transmitting part encounters no real resistance, in this design the whole unit consisting of the sleeve, the spring, the rubber body, the end wall and the cover will be caused to rotate forwards during the application stroke. When a resistance subsequently occurs, a working stroke will be produced together with a reduction in the diameter and an elongation of the rubber body as stated above.

The end wall is thus given the rotating input motion, although during the application stroke the end wall will also be caused to move axially. In order to permit this to occur, the end wall is provided with an axial, deep hole into which is introduced a long driving pin of matching cross-sectional form, said driving pin being so arranged as to be imparted with the rotating input motion.

This rotating input motion can be produced by causing an electric motor, mounted on a flange on the housing, to have a toothed wheel in driving engagement with a gear ring mounted on the housing providing a driven connection with the drive pin via a driving pulley.

DESCRIPTION OF THE DRAWING

The invention is described in greater detail below with reference to the accompanying drawing, which in a partially sectioned side view shows a typical embodiment of a device according to the invention; on the left-hand side of the drawing there appears a stroke/-force diagram for the device.

DESCRIPTION OF A PREFERRED EMBODIMENT

The device has an essentially cylindrical housing 1, to which is attached a flange 2. This in turn is provided with an ear 3 (on either side) for the attachment of the device. An electrical drive motor 4 is attached to the flange 2.

A toothed wheel 5 on the output side of the motor 4 is in driving engagement with a gear ring 6 mounted on the housing 1 by means of a bearing 7. A driving member 8 is attached to the gear ring 6 by means of screws 9. The arrangement described here is covered by means of a cap 10 attached to the flange 2.

A drive pin 11 of square cross-section is rigidly mounted on the driving member 8. An end wall 12 is axially movable on the drive pin 11, but is prevented from rotating in relation to it because its internal cross-section matches the cross-section of the drive pin.

A bearing 13 is arranged between the end wall 12 and a sleeve 14 which, on its right-hand part as shown in the drawing, is provided with an external thread in engagement with a corresponding internal thread in the housing 1.

Inside the sleeve 14 is arranged a tensioned, tightly wound coil spring 15, the right-hand end of which is attached to the end wall 12 and the lefthand end to the sleeve 14. The space inside the coil spring 15 is filled with a long, cylindrical rubber body 16, the left-hand end of which as shown in the drawing is provided with a cover 17 in contact with a force-transmitting ear 18, which is designed to be non-rotatably attached to a component (not shown) for transmitting the force of the device. To the ear 18 is also attached a protective tube 19 which extends inwards over the housing 1 to permit axial movement thereon.

The described device functions in the following manner:

On starting up the motor 4 a rotating motion is imparted to the cover 17 via the toothed wheel 5, the gear ring 6, the driving member 8, the drive pin 11, the end wall 12 and the coil spring 15. The rotating motion also involves the sleeve 14, which for this purpose is threaded to the left inside the housing 1. In this movement to the left the whole of the unit consisting of the components 12, 13, 15, 16 and 17 also participates, so that the ear 18 will move to the left until an application stroke A has been completed or, to put it another way, until the ear 18 experiences a counter-force F.

When this counter-force F is so great that the torque from the end wall 12 to the spring 15 is greater than the torque at which said spring is being tensioned within the sleeve 14, the application stroke will be complete and will be transformed into a so-called elasticity stroke, that is to say a force-transmitting working stroke.

The rotating motion of the sleeve 14 will then stop, although the end wall 12 will continue to rotate on the bearing 13. The twisting of the spring 15 and the rubber body 16 will cause the internal diameter of the spring to reduce. Since the volume of the rubber remains constant, the length of the rubber body will then be obliged to increase, forcing the cover 17 and the ear 18 to move to the left during an elasticity stroke E until the desired maximum force $F_{max}$ has been reached.

By the appropriate choice of the diameter and length of the rubber body 16 in relation to the cross-section of the wire in the coil spring 15, it will be possible to achieve the desired elasticity stroke without overloading the rubber body.

A calculation based on the embodiment illustrated and described, in which the diameter of the rubber body 16 is 42 mm, the number of coils in the coil spring 15 is 31, and the axial cross-sectional dimension of the spring wire is 3.5 mm, and on the assumption that the permissible twisting of the rubber body amounts to three-quarters of a turn, a maximum elasticity stroke of slightly more than 5 mm will be achieved (whereas the application stroke may be very much longer, for example ten times longer). For a selected quality of rubber its possible slit width will permit a maximum output force of 14 kN to be achieved, corresponding to an input torque of 16 kNm.

It will be appreciated that the long rubber body exhibits hydraulic characteristics (i.e. when subjected to a force does not change substantially in volume); it is conceivable within the context of the invention to utilize another material which exhibits similar characteristics, for example a thermoplastics material. It is also conceivable to utilize an oil-filled bag or a body consisting of an outer layer of a harder material containing an inner body of a softer material.

Other modifications are of course possible within the context of the following claims.

I claim:

1. A device for mechanically transforming a torque into an axial force, characterized by a long body (16) having short sides and made of a material which exhibits hydraulic characteristics enclosed within a tightly wound coil spring (15), one end of which is attached to an axially fixed, torque-receiving end wall (12) in contact with one of the short sides of the body and the other end of which is attached to an axially movable, force-transmitting cover (17) in contact with the other short side of the body, the device being so constructed that the diameter of the coil spring and thus of the body is reduced as the end wall rotates under the effect of the torque and the length of the body is correspondingly increased.

2. A device as claimed in claim 1 enclosed within a cylindrical, fixed housing (1), characterized in that the coil spring (15) is arranged inside a cylindrical sleeve (14) to which the end of the coil spring at the cover (17) is attached and which is provided with external threads in engagement with internal threads in the housing (1).

3. A device as claimed in claim 2, characterized in that the end wall (12) has an axial, deep hole into which is introduced a long drive pin (11) of matching cross-sectional form, said drive pin being so arranged as to be imparted with the rotating input motion.

4. A device as claimed in claim 3, characterized in that an electric motor (4) mounted on a flange (2) on the housing (1) has a toothed wheel (5) in driving engagement with a gear ring (6) mounted on the housing providing a driven connection with the drive pin (11) via driving member (8).

* * * * *